United States Patent [19]

Scott

[11] Patent Number: 4,500,979
[45] Date of Patent: Feb. 19, 1985

[54] OPTICAL SEISMIC TRANSDUCER

[75] Inventor: Gary L. Scott, Sugarland, Tex.

[73] Assignee: Western Geophysical Co of America, Houston, Tex.

[21] Appl. No.: 302,873

[22] Filed: Sep. 16, 1981

[51] Int. Cl.³ .................. G01V 1/16; G01V 1/18; G01D 5/26

[52] U.S. Cl. .................. 367/149; 367/178; 350/358; 73/653

[58] Field of Search .......... 367/149, 178, 912; 73/653, 655, 108, 649; 29/594; 350/358; 181/122

[56] References Cited

U.S. PATENT DOCUMENTS

| | | | |
|---|---|---|---|
| 3,429,184 | 2/1969 | Russel | 73/382 |
| 3,435,656 | 4/1969 | Jordan et al. | 73/1 |
| 3,693,400 | 9/1972 | Savit | 73/1 DV |
| 3,831,137 | 8/1974 | Cuomo | 350/358 |
| 3,961,185 | 6/1976 | Brokenshire et al. | 73/653 |
| 4,188,096 | 2/1980 | Shazenko | 350/358 |
| 4,322,829 | 3/1982 | Davis et al. | 367/178 |
| 4,363,114 | 12/1982 | Bucaro et al. | 367/149 |

OTHER PUBLICATIONS

Shazenko et al., "Signal Stabilization . . . Source", 6/15/80, pp. 1895-1897, Appl. Optics, vol. 19, 1980.

Primary Examiner—Nelson Moskowitz
Attorney, Agent, or Firm—William A. Knox

[57] ABSTRACT

A spring-suspended mass has top and bottom reflectors. A laser light beam is divided into separate beams that are reflected from the top and bottom reflectors into photo detectors. At the photo detectors, a reference beam from the same laser is recombined with the two reflected beams to produce two interference fringe patterns in response to seismic disturbances of the mass. A count of the number of fringes and fractions thereof that are detected over a unit time interval is proportional to velocity of the mass in terms of the wavelength of the laser beam. The phase difference between the two interference fringe patterns is a measure of polarity of the seismic disturbances.

13 Claims, 3 Drawing Figures

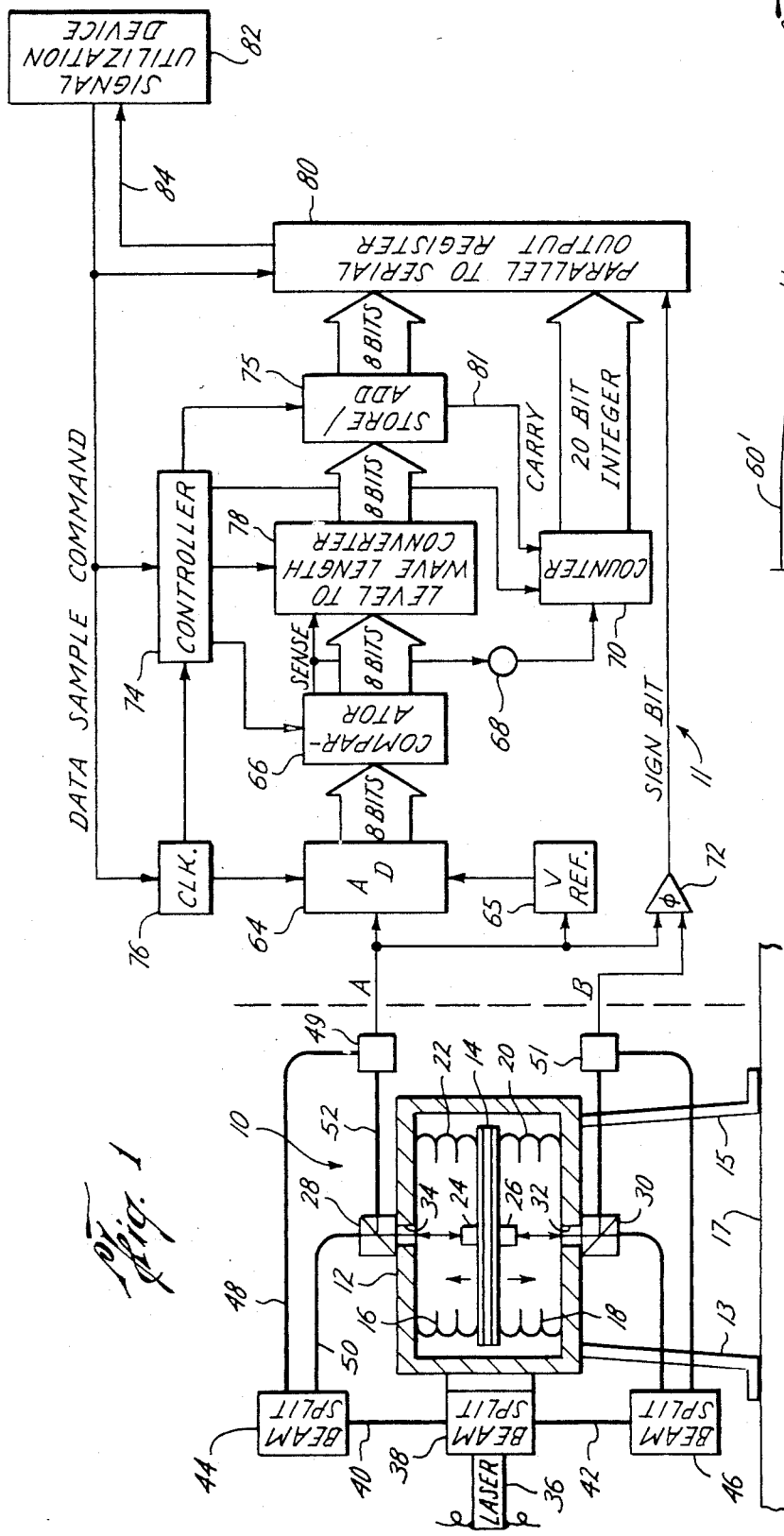
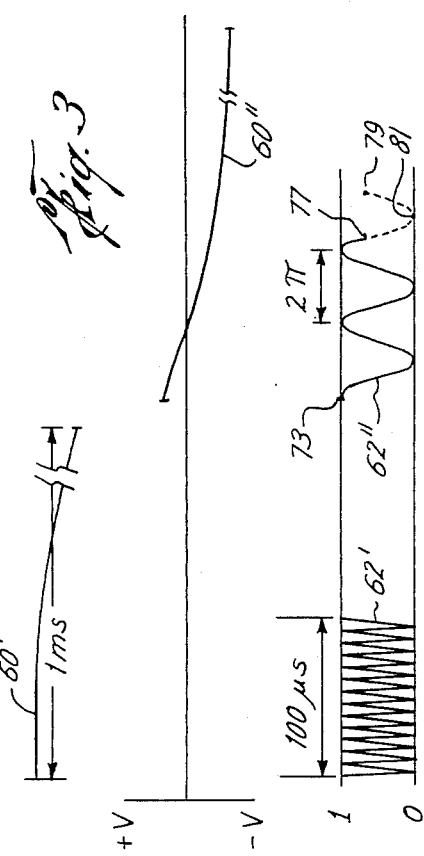
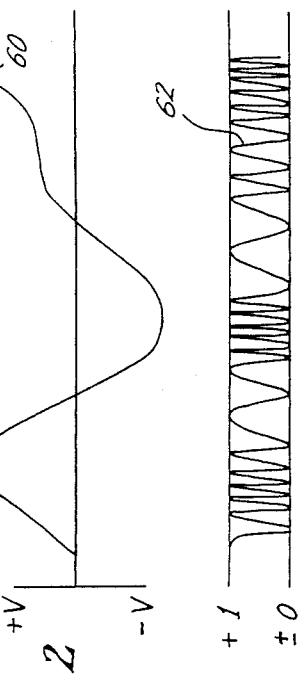

OPTICAL SEISMIC TRANSDUCER

BACKGROUND OF THE INVENTION

1. Field of the Invention

This invention employs optical interferometry to measure the motion of a seismic mass in response to earth movements to yield a direct digital output signal proportional to particle velocity.

2. Discussion of the Prior Art

Conventional seismic transducers such as geophones measure particle velocity of the earth, the earth motion being due to ground unrest or to an acoustic disturbance. Typical commercial geophones have an active element consisting of a spring-suspended bobbin whereon is wound a coil of fine wire. The coil is suspended in a magnetic field. Relative movement between the coil and the magnetic field creates an analog voltage in the coil that is proportional to particle velocity. The analog output signals are transmitted to a signal utilization device over suitable conductors which, in commercial operations, may be several kilometers long.

During transmission, the analog signals become distorted due to such environmental problems as conductor losses, electrical leakage to ground, stray capacitance, and external interference from power lines and atmospheric electrical transients. The distortion is particularly distressing at low signal levels of a few microvolts per centimeter per second.

Many of the above problems may be alleviated by quantizing, at the geophone, the analog signals as digital data words. One convenient means for providing a digital output signal is to employ an optical sensor. In such a sensor, a moving mass is provided with a reflector. A beam of coherent light is reflected from the moving mass and is mixed with a directly-transmitted coherent light beam to create a pattern of interference fringes. A count of the number of fringes that occur within a unit time provides a digital number proportional to the velocity of the moving mass in terms of the wavelength of the coherent light beam.

Transducers that employ optical interferometry for measuring displacements of the velocity of motion of a moving mass are known. U.S. Pat. Nos. 3,693,400; 3,429,184 and 3,435,656 are examples. I have found that those devices are primarily designed for laboratory use under idealized conditions. They are unsuitable for field use. Typically the transducers are capable of measuring the displacement of the mass but not the direction of the displacement. The transducers count only the number of integral interference fringes that are observed. Fractional fringes are ignored. Hence the measurement resolution of the transducers is impaired.

SUMMARY OF THE INVENTION

It is the object of this invention to provide a seismic transducer that provides a high-resolution digital output signal proportional to particle veloctiy of the earth, in terms of wavelengths and fractions thereof of radiation having a selected frequency.

In an aspect of this invention, I provide a seismic transducer including a mass, having opposite faces, resiliently suspended from a ground-contacting support. An interferometric device measures simultaneously, the displacements of the opposite faces of the mass. Means are provided to combine the separate displacement measurements to derive a digital representation of the magnitude and direction of the movement of the mass over a unit time interval, measured with respect to the support.

In accordance with a preferred embodiment of this invention, a spring-suspended mass is provided having top and bottom reflectors. A radiation beam from a source is divided into separate beams that are reflected from the top and bottom reflectors and thence are directed into photo detectors. A pair of reference beams from the same source are directed into the respective photo detectors where they are combined with the reflected beams to produce a pattern of interference fringes in response to movements of the mass.

The output signals of the respective photo detectors are sinusoidal electrical wave trains whose frequency is proportional to the velocity of the mass. The direction of motion is determined from the relative phase shift between the two wave trains. A phase comparator generates a suitable sign bit.

At selected data-sample intervals, the output wave train of one photo detector is quantized at a desired subsample rate. A comparator determines the slope of the envelope of the wave train at each subsample interval, generates a sense bit and stores temporarily the value of the present subsample. A peak-detector and counter detects and counts peaks of the wave train over a discrete subsample period that is less than the data-sample interval. At the end of the discrete subsample period, the content of the counter represents the integer portion of a data word whose value is proportional to relative mass displacement over a unit time period in terms of wavelengths of the incident radiation. The content of the comparator, that is, the value of the first and last subsamples at the beginning and end of the subsample period, are combined with the sense bit to form the fractional portion of the data word. The sign bit, integer part and fractional part are combined into a single digital data word, having a desired resolution, that is directly proportional to the velocity of the mass. The data word is transmitted to a data-word utilization device such as a digital tape recorder.

BRIEF DESCRIPTION OF THE DRAWINGS

A better understanding of this invention may be obtained by studying the detailed description and the drawings wherein:

FIG. 1 is a schematic showing of one embodiment of an optical seismic transducer with its accompanying electronic circuitry;

FIG. 2 illustrates an amplitude-modulated seismic signal representative of particle velocity and the corresponding sinusoidal signal generated by a photo detector;

FIG. 3 illustrates the relation between data-sample interval and subsample period.

DETAILED DESCRIPTION OF THE PREFERRED EMBODIMENT

Referring now to FIG. 1 there is shown an optical seismic transducer 10 and associated electronics 11. The transducer, which may be a geophone or seismometer for example, consists of a support or frame 12 from which is suspended a seismic mass 14 by means of springs 16, 18, 20, 22. The suspension means shown is exemplary only; any other desired means may be used without departing from the spirit of this invention. Legs 13 and 15 support transducer 10 on ground surface 17. For clarity, the device and the electronics are shown as an exploded view. It is contemplated that, in practice, all of the components will be contained within a single case.

First and second reflecting surfaces 24, 26, preferably retroreflectors such as tetrahedral prisms of any well known type, are secured to the top and bottom surfaces of seismic mass 14, preferably centered thereon. First and second beam splitters 28, 30 such as a half-silvered mirror or a split optical cube as illustrated, are mounted above and below support 12, axially with respect to reflectors 24 and 26. Suitable openings 32, 34 are provided in support 12 for the passage of reflected coherent radiation beams.

A source of coherent radiation 36 is provided, such as a neodymium—doped YAG laser, that emits radiation in the near infra-red at a wavelength of 1.064 micrometers. Solid-state devices such as light-emitting diodes of any well known type also may be used, particularly if the size of the complete sensor package is critical. A first beam splitter 38 directs a beam of coherent radiation in opposite directions through optical fibers 40, 42 which preferably have a single-mode propagation characteristic, to upper and lower beam splitters 44, 46.

Upper beam splitter 44 divides the incident radiation transmitted through fiber 40 into a reference beam, which is launched into optical fiber 48 towards photo detector 49 of any well known types, and a signal beam that propagates through optical fiber 50 to beam splitter 28. The signal beam is directed through beam splitter 28 to reflector 24 whence the signal beam returns to beam splitter 28 where it is deflected 90 degrees into optical fiber 52, thence into photo detectors 49. In photo detector 49, the signal beam is mixed with the reference beam by well-known means. The signal beam reflected from the moving mass has a constantly changing path length. When the signal beam is mixed with the reference beam, a pattern of interference fringes is produced, consisting of alternate light and dark bands of radiation.

Photo detector 49 sees the interference pattern as a beat frequency and converts variations in the radiation intensity of the fringes into a corresponding sinusoidal electrical signal. The signal produced by photo detector 49 will hereafter be designated as the A signal.

The lower optical configuration associated with lower beam splitter 46 is identical to the upper optical configuration just described. No further discussion is needed therefore with respect to the lower configuration except to say that the electrical output of lower photo detector 51 will be designated as the B signal.

In the above discussion, it is assumed that the radiant beams remain coherent and that no substantial spreading occurs particularly in the signal beam. If such spreading does indeed occur, then suitable collimator lenses may be introduced into the affected optical path in a configuration well known to those skilled in the optical arts.

The effective length of the optical path of the reference beam should be matched to the optical path length of the signal beam. Allowance must be made for the short distance that the upper signal beam propagates through the air gap between beam splitter 28 and reflector 24. The air gap for the lower signal beam must be similarly considered. With the mass 14 at rest and with matched optical paths, either an intensity null or an intensity maximum will be sensed by a photo detector such as 49, depending upon whether the signal and reference beams are 180 degrees out of phase or exactly in phase with each other. The output of the photo detector will be a DC electrical signal.

When support 12 is disturbed as by an earth-borne acoustic wave, the electrical output of photo detector 49, the A signal, will be a sinusoid having a frequency proportional to the relative velocity between support 12 and mass 14. Acting as a geophone, therefore, transducer 10 measures particle velocity in terms of the wavelength of the radiation used. If a laser is used that emits radiation whose wavelength is very nearly one micrometer, a count of the number of fringes observed (intensity maxima for example) during a period of 200 microseconds ($\mu s$) is very nearly a direct measure of particle velocity in centimeters per second. The base time period of 200 $\mu s$ is required because of the two-way travel path of the reflected signal beam. That is, a shift of one interference fringe, as seen by photo detector 49, represents a mass displacement of a half wavelength.

It is well-known by geophysicists that an oscillating system such as geophone 10 must be damped, preferably about 0.7 critical. At least two damping methods are known: viscous and electromagnetic.

Using viscous damping, support 12 would be a closed container filled with a fluid of suitable viscosity. Preferably that fluid is a liquid having an index of refraction substantially the same as that of beam splitters 28 and 30, and transparent to radiation in the near infra-red spectrum. By use of such a liquid, light loss at the beam splitters will be minimized.

Electromagnetic damping requires use of a coil attached to or integral with mass 14, the coil moving in a magnetic field. The coil leads are terminated at a load resistor to generate the necessary damping force. The side benefit of electromagnetic damping is that the polarity of the voltage induced in the coil can be used as a backup indicator of the polarity of the seismic signal.

Referring now to FIG. 2 there is shown schematically the relationship between a seismic signal 60 and the sinusoidal A signal 62 of the seismic signal 60 as output by photo detector 49. The low frequency seismic wave is assumed to be representative of particle velocity. The frequency range of the amplitude-modulated seismic velocity signal is usually about 10–200 Hz. The frequency range for the A signal may lie between DC for zero velocity to a value on the order of several megahertz assuming an upper limit for particle velocity of one meter per second and 1-micrometer radiation.

The digital section 11 of geophone 10 is shown to the right of the dashed line in FIG. 1. The purpose of the digital section is to provide a digital data sample that is a measure of particle velocity and direction of a seismic wave over a discrete subsample period such as a 200 $\mu s$.

Several definitions now will be made to avoid future ambiguity. The wave form 60 in FIG. 2 is termed a seismic wave or seismic signal. Wave train 62 is a beat-frequency sinusoidal analog of the seismic signal and will continue to be termed the A signal. Seismic signal 60 is to be sampled at desired data-sample intervals, typically one-millisecond intervals. The A signal 62 shown as a continuous wave train in FIG. 2, is subsampled at desired subsample intervals of from 10 to 100 megahertz, depending the highest frequency expected. The A signal is subsampled in bursts over a subsample period or time window of 200 $\mu s$ as shown in FIG. 3, to be explained more fully later. The beginning of the subsample period coincides with the beginning of each data sample interval.

The principal components of the digital circuitry 11 are analog-to-digital (A/D) converter 64, comparator/storage 66, peak detector 68, counter 70, phase detector 72, reference voltage generator 65, clock 76, level-to-fraction converter 78 and an output register such as a parallel/serial converter 80. Conventional power supplies, well known to the art are not shown to avoid excessive detail in FIG. 1.

The A and B signals from photo detectors 49 and 51 are always present so long as transducer 10 is in operation. The two signals are compared in phase comparator 72 whose output is false if the A signal lags the B signal and is true if the A signal leads the B signal. The output of phase comparator is the sign bit and defines the slope of the envelope of seismic signal 60 at the time of sampling. The slope is positive if the sign bit is false and negative if the sign bit is true. The sign bit is transmitted to the high-order bit slot of output register 80.

Clock 76 controls timing of the digital components. Its primary function is to provide a precise time window, termed the subsample period, of a desired duration, preferably 200 µs, that begins upon the receipt of a data-sample command. That is, a signal utilization device 82 sends a data-sample command pulse to clock 76, thereby triggering the clock to start timing and initiate the subsample period to allow subsampling of the A signal such as at 62′ or 62″ at a desired subsample rate. The subsampling period or time window preferably is a desired integral submultiple of the data-sample interval.

A/D converter 64, preferably capable of operating at 100 megahertz, subsamples the A signal 62 at a desired subsample rate. A preferred converter is A/D 5010 made by Analog Devices Inc. of Norwood, Mass. The subsampled A signal is preferably converted to an 8-bit digital number.

The reference voltage for A/D converter 64 is provided by reference voltage generator 65. The intensity of light radiated by laser 36 is constant except for aging or drift due to environmental changes. Therefore, the peak levels of A signal 62 are also substantially constant. Reference voltage generator 65 integrates the peak levels of A signal 62 over a suitable time period and scales the resulting voltage to a value required by A/D converter 64, thereby providing the reference voltage required for quantizing the incoming A signal wave train. The system is therefore self compensating for environmental changes and aging.

From A/D converter 64, the 8-bit quantized subsample is sent to comparator/storage 66. In comparator 66, the value of the present subsample is compared with the value of the previous subsample. If the present subsample is less that the previous one, the slope of the envelope of waveform 62 is negative at the time of subsampling. The comparator generates a sense bit which is a binary zero or false for a negative slope and a binary 1 or true for a positive slope. Thus, the comparator/storage register 66 provides a means for determining the algebraic sign of the first-order difference between successive A-signal subsamples. The sense bit is not to be confused with the sign bit generated by phase comparator 72. At each subsample time, the sense bit is updated, the present subsample is stored in comparator 66 and the sense bit is transmitted to peak detector 68.

Peak detector 68 may be any desired type of gate or flip-flop that will emit a pulse to counter 70 in response to a transition of the sense bit from true to false, i.e. detector 68 is a state transition detector. The opposite sense-bit transition will reset the peak detector. Each pulse from peak detector 68 increments counter 70 by one count.

Counter 70 preferably has a resolution of 20 bits. The contents of counter 70, at the end of a subsample period or time window, constitutes the integer portion of a digital number that is proportional to the number of integral wavelengths that mass 14 has moved during the subsample period. If the wavelength, $\lambda$, of the radiation is 1.064 µm and if the duration of the subsample period is 187.8 µs (rather than the preferred 200 µs), then the digital number is a measure of the velocity in centimeters per second.

The subsample period begins upon arrival of a data-sample command. There is no assurance that the subsample period will begin at, say, a peak of a cycle of signals 62′ or 52″ as ideally shown at 73 of FIG. 3, or that the period will end with an integral peak count. Level-to-fraction converter 78 computes the angular fraction of a cycle between peaks at the beginning and end of a subsample period. The angular fraction value is computed from the amplitude level of the first and last subsamples received during the subsample period.

Refer now to FIG. 3. The upper portion of the Figure shows two exemplary, expanded, one-millisecond segments of seismic velocity signal 60 as 60′ and 60″; one segment 60′ is a high-level velocity signal and one segment, 60″, is a low-level velocity signal. Below are shown two 200-µs bursts 62′, 62″, whose frequency is proportional respectively to the average velocity levels of seismic signals 60′ and 60″ at the beginning of each one-millisecond data-sample interval. Note that neither envelope ends at an integral signal cycle.

It is the task of the level-to-fraction converter to compute the angular fractions of a cycle that occur at the beginning and at the ending of the subsample period, and to add the two fractions together to yield a total fraction, plus a carry count if needed.

Level-to-fraction converter 78 may be a read-only memory (ROM) in combination with a holding register/adder with carry 75. I have found that the envelope of the A signal, being always positive and, except for conditions of zero mass displacement, ranging from zero to some constant amplitude level called "full scale", is actually a type of cycloid or sinusoid. Given the amplitude of any subsample, it is possible to determine the angular position of that subsample, relative to a complete cycle, from suitable parametric equations except for an ambiguity of $\pi$. The ambiguity may be resolved by observing the sense bit. Referring to FIG. 3, if the subsample amplitude is one-half scale as shown at points 77 and 79, then the angular fraction of that sample must be either $\pi/2$ or $3\pi/2$. If the sense bit is zero (negative envelope slope), then the angular fraction is $\pi/2$.

The ROM of converter 78 is loaded with a table of subsample signal-amplitudes, computed with a resolution of 8 bits, versus angular fraction values also with 8 bits of resolution. The digital word representing the subsample signal level is the address and the contents of the ROM at that address become the output data word transmitted to holding register/adder 75.

In operation, a data sample command is received by controller 74 and clock 76 to initiate a subsample period and to take a first subsample. The first subsample is received by comparator/register 66 and controller 74 causes that first subsample to be stored only. At the second clock stroke, a second subsample is received by comparator/register 66. The second subsample is compared to the first to generate a sense bit. Thereupon, controller 74 causes comparator 66 to transfer the first subsample together with the sense bit to level-to-fraction converter 78, and the second subsample is stored in the comparator register. The sense bit becomes the most significant bit of the original 8-bit subsample data word and the least significant bit of that word is dropped. The now-modified data word becomes the input address to the ROM. The ROM output is the angular fractional cycle. Controller 74 transfers the output of level-to-fraction converter to holding-register/adder 75 as an 8-bit fractional data word. Since the first subsample must be referenced ahead of a peak, rather than behind the peak as shown in FIG. 3, controller 74 causes adder 75 to complement the fractional data word, representing the first subsample, by means well known to the art.

Having processed the first subsample, level-to-fraction converter 78 and holding-register/adder 75 are placed in a standby state by controller 74. As the second and subsequent subsamples are strobed into comparator register 66, they are compared, the sense bit is updated and directed to peak detector 68. Whenever a sense bit transition occurs from true to false, that is, when the sense bit changes from a first state to a second state, a count is sent to counter 70 from peak detector 78 as previously described.

At the end of the subsample period, controller 74 directs the last subsample data word and the sense bit to level-to-fraction converter 78 as for the first subsample. The output of converter 78 is transferred to holding-register/adder 75 as before, except that the last subsampled data word is not complemented but is added directly to the first subsampled data word. If the sum results in a carry, the carry bit is transmitted to counter 70 over line 81 to increment the counter by one additional count. Controller 74 now causes counter 70 and holding register/adder 75 to transfer their contents in parallel to output register 80. At the same time, controller 74 resets all of the respective components to their initial conditions. Upon the arrival of the next data sample command, the contents of output register 80 are transmitted in serial order as a real 28-bit data word plus sign to signal utilization device 82 over line 84 while a new data sample is being processed. The data word is thus representative of the velocity vector of the mass over the subsample period.

This invention has been described in exemplary terms only. For example, the A/D output word may include more or fewer bits that 8. The capacity of counter 70 is governed by the number of interference fringes that accumulate during the subsample period which, in turn may be more or less than 200 $\mu s$ wide. Although a frequency to voltage converter having a digital output could be used in place of the A/D converter, it must be remembered that such a converter necessarily counts only the peaks of the A signal; it is incapable of extending the count to fractional cycles. I consider the ability to resolve fractional cycles to be an important part of my invention. I thereby provide substantially increased resolving power, not possible in earlier related art, for both large and small signal levels. That increased resolution is particularly useful where very small particle velocities are involved as at the zero-crossings of seismic signal 60, where only a few fringes are seen during the subsample period, or for very low-level seismic signals.

Earlier, the possibility of viscous damping was discussed with the damping fluid having substantially the same index of refraction as beam splitters 28 and 30. Use of such a fluid would render equal, the optical paths of the upper and lower signal beams regardless of the position of retroreflectors 24 and 26 with respect to beam splitters 28 and 30.

Radiation in the near infra-red portion of the spectrum is preferred but electromagnetic radiation of any other wave length may be used so long as the involved wavelengths provide the necessary resolution. Sonic radiation of suitable wave length is not excluded.

In the above exemplary discussion, it has been assumed that the total count is based upon counting fringe-intensity peaks. A count of nulls would be equally acceptable as would a count of specified fractional levels such as half-scale.

I claim as my invention:

1. An improved seismic transducer of the type including a mass resiliently mounted for relative motion with respect to an earth-contacting housing in response to seismic waves and means for detecting motion of the mass with respect to the housing utilizing a beam of coherent radiation reflected from a first face of the mass, wherein the improvement comprises:
   means for reflecting a second beam of coherent radiation from a face of the mass opposite to the first face;
   means for creating a pair of interference fringe patterns by separately combining each of the beams of coherent radiation with one or more reference beams; and
   means for processing said interference fringe patterns to determine the magnitude and direction of said relative motion.

2. A seismic transducer according to claim 1 wherein the means for processing further comprises:
   means for counting interference fringes of said fringe pattern during a predetermined unit time interval to generate a signal related to the velocity and direction of said relative motion.

3. A seismic transducer according to claim 2 wherein the means for processing further comprises:
   means for counting fractional portions of said interference fringe count.

4. The seismic transducer according to claim 1 comprising:
   means for comparing the phase difference between said pair of interference fringe patterns to define the direction of motion of said mass.

5. The seismic transducer as defined in claim 4, comprising:
   means for converting the pair of optical interference fringe patterns into a pair of sinusoidal electrical signals having alternate peaks and nulls;
   means fo periodically subsampling and quantizing one of said sinusoidal signals during a desired subsample period;
   means for determining the algebraic sign of the first-order difference between successive signal subsamples to generate a sense bit having two states;
   means for detecting a transition of said sense bit from a first state to a second state; and
   a counter receiving a count from the transition detecting means at each occurrence of a transition from first to second states.

6. The seismic transducer according to claim 5, comprising:
   an output register;

a phase comparator having two inputs for receiving said pair of sinusoidal signals, the phase comparator providing a digital output signal that goes true when a first sinusoidal signal leads a second sinusoidal signal and goes false when the first sinusoidal signal lags the second sinusoidal signal; and means for transmitting the output signal of said phase comparator to said output register as a sign bit.

7. The seismic transducer according to claim 6, comprising:

a subsample clock for initiating, and terminating said desired subsample period at desired data sample intervals and for controlling the subsample rate of said quantizing means; and means, associated with said transition detecting means, for combining and converting the first and last subsampled signal values to an angular fractional cycle.

8. The seismic transducer according to claim 7, comprising:

means, associated with said subsample clock for transferring, upon termination of said desired subsample period, the contents of said counting means and said fractional-count converting means to said output register, as a real multibit digital number plus sign.

9. The seismic transducer according to claim 8, comprising:

means in said subsample clock for terminating said subsample period at the end of a desired time interval whose duration is an integral submultiple of said data sample interval.

10. The seismic transducer according to claim 9, comprising:

means associated with said output register for receiving a data sample command and in response thereto for transmitting the digital number resident in said output register to a signal utilization device in bit-serial order.

11. The seismic transducer according to claim 1, comprising:

a damping fluid contained within said housing, for applying a desired damping to said mass and for equalizing the optical paths of said top- and bottom-reflected beams.

12. A seismic sensor having a housing and a mass, having opposite faces, resiliently suspended therefrom, comprising:

means for simultaneously measuring interferometrically the displacement of the opposite faces of said mass relative to the housing; and means for combining the measured displacements of said opposite faces to derive a combination signal that is representative of the magnitude and direction of the displacement of said mass relative to said housing.

13. The seismic sensor as defined by claim 12, wherein:

said displacements are measured over a unit time interval so that said combination signal is representative of the velocity vector of said mass relative to said housing.

* * * * *